(12) United States Patent
Cotton et al.

(10) Patent No.: US 11,169,292 B2
(45) Date of Patent: Nov. 9, 2021

(54) COMBINATION OF CONTROLLED AND UNCONTROLLED SEISMIC DATA

(71) Applicant: CGG SERVICES SA, Massy (FR)

(72) Inventors: Julien Cotton, Paris (FR); Florian Duret, Montigny-le-Bretonneux (FR); Eric Forgues, Bures-sur-Yvette (FR)

(73) Assignee: SERCEL SAS, Carquefou (FR)

(*) Notice: Subject to any disclaimer, the term of this patent is extended or adjusted under 35 U.S.C. 154(b) by 579 days.

(21) Appl. No.: 15/119,433

(22) PCT Filed: Dec. 19, 2014

(86) PCT No.: PCT/IB2014/003246
§ 371 (c)(1),
(2) Date: Aug. 17, 2016

(87) PCT Pub. No.: WO2015/124961
PCT Pub. Date: Aug. 27, 2015

(65) Prior Publication Data
US 2017/0052269 A1 Feb. 23, 2017

Related U.S. Application Data

(60) Provisional application No. 61/943,891, filed on Feb. 24, 2014.

(51) Int. Cl.
*G01V 1/36* (2006.01)
*G01V 1/28* (2006.01)

(52) U.S. Cl.
CPC .............. *G01V 1/36* (2013.01); *G01V 1/288* (2013.01); *G01V 2210/121* (2013.01);
(Continued)

(58) Field of Classification Search
CPC .... G01V 1/36; G01V 1/288; G01V 2210/121; G01V 2210/123; G01V 2210/127;
(Continued)

(56) References Cited

U.S. PATENT DOCUMENTS

| 2008/0232195 A1* | 9/2008 | Bloor ..................... G01V 1/30 367/38 |
| 2015/0046093 A1* | 2/2015 | Pires De Vasconcelos ................. G01V 1/307 702/16 |
| 2016/0334270 A1* | 11/2016 | Van Manen ......... A61B 8/0866 |

FOREIGN PATENT DOCUMENTS

WO 2010/080366 A1 7/2010

OTHER PUBLICATIONS

International Search Report in related International Application No. PCT/IB2014/003246, dated Oct. 9, 2015.
(Continued)

*Primary Examiner* — Eman A Alkafawi
(74) *Attorney, Agent, or Firm* — Patent Portfolio Builders PLLC

(57) ABSTRACT

The present disclosure includes a method for combining controlled and uncontrolled seismic data. The method includes accessing one or more controlled signals, each controlled signal associated with a respective receiver of a plurality of receivers. The method also includes accessing one or more uncontrolled signals, each uncontrolled signal associated with a respective receiver of the plurality of receivers. The method also includes generating one or more reconstructed signals based on the one or more uncontrolled signals. The method also includes generating a composite image based at least on the one or more controlled signals and the one or more reconstructed signals. The present disclosure may also include associated systems and apparatuses.

20 Claims, 5 Drawing Sheets

(52) U.S. Cl.
CPC .. *G01V 2210/123* (2013.01); *G01V 2210/127* (2013.01); *G01V 2210/51* (2013.01); *G01V 2210/6161* (2013.01); *G01V 2210/679* (2013.01)

(58) Field of Classification Search
CPC ....... G01V 2210/51; G01V 2210/6161; G01V 2210/679
USPC ..................................................... 702/14–16
See application file for complete search history.

(56) References Cited

OTHER PUBLICATIONS

Written Opinion of the International Searching Authority in related International Application No. PCT/IB2014/003246, dated Oct. 9, 2015.
C. Park et al., "Multichannel Analysis of Surface Waves (MASW)—Active and Passive Methods", The Leading Edge, Jan. 2007, vol. 26, No. 1, Society of Exploration Geophysicists.
I. Vasconcelos et al., "Broadside Imaging of the San Andreas Fault System at Depth", SEG Annual Meeting 2007, Sep. 23, 2007, Society of Exploration Geophysicists.

* cited by examiner

COMBINATION OF CONTROLLED AND UNCONTROLLED SEISMIC DATA

CROSS-REFERENCE TO RELATED APPLICATION

This application claims the benefit under 35 U.S.C. § 119(e) of U.S. Provisional Application Ser. No. 61/943,891 filed on Feb. 24, 2014, which is incorporated by reference in its entirety for all purposes.

TECHNICAL FIELD

The present invention relates generally to seismic imaging and, more particularly, to systems and methods for combining controlled and uncontrolled seismic data.

BACKGROUND

Seismic exploration, whether on land or at sea, is a method of detecting geologic structures below the surface of the earth by analyzing seismic energy that has interacted with the geologic structures. A seismic energy source generates a seismic signal that propagates into the earth, where the signal may be partially reflected, refracted, diffracted, and/or otherwise affected by one or more geologic structures such as, for example, interfaces between underground formations having varying acoustic impedances. Seismic imaging systems include one or more sources that can be arranged in various configurations. For example, sources can be placed at or near the earth's surface, on or within bodies of water, or below the earth's surface. Seismic sources can be controlled or uncontrolled. A "controlled source" is a source that deliberately generates seismic signals at the control of the seismic imaging system. A seismic wave that is deliberately generated by a controlled source at the direction of the seismic imaging system is referred to as a "controlled signal" or an "active signal," and the images resulting from the processing of these signals are referred to as "controlled seismic data" or "active seismic data." An "uncontrolled source" is a source that produces a seismic wave that is not deliberately generated by the seismic imaging system. Uncontrolled sources may be natural or anthropogenic (such as, for example, ambient noise, industrial noise, or ocean waves). A seismic wave that is generated by an uncontrolled source is referred to as an "uncontrolled signal" or a "passive signal." Uncontrolled signals can also be generated by controlled sources when such sources produce signals that are not coordinated by the seismic imaging system. For example, if a controlled source generates signals with unknown trigger times, positions, or frequency content, these signals may be characterized as uncontrolled signals.

Seismic receivers placed at or near the earth's surface, within bodies of water, or below the earth's surface in wellbores are able to detect the seismic signals and record them. The recordings are processed to generate information about the location and physical properties of the subsurface geologic structures that interacted with the seismic signal. A set of recordings taken during a particular time period may be referred to as a "survey." One or more signals recorded from a single survey can be used to generate an image of the subsurface formations. Such images, referred to as "2D images" or "3D images," indicate the state of the subsurface formations during the time period in which the survey was taken. Seismic data can also be gathered at different times. This type of analysis is referred to as "time-lapse" or "4D" imaging. "Permanent Reservoir Monitoring" (PRM) or "Continuous Reservoir Monitoring" (CRM) is used to perform 4D imaging near a reservoir over an extended period of time, though such implementations need not be permanent or continuous. 4D processing of two seismic datasets recorded at different times facilitates the determination of how and where the Earth's properties have changed during that time period. 3D and 4D images are typically generated from the recording and processing of controlled signals.

The quality of 3D and 4D images can depend on the frequency content of the seismic waves used during the imaging process. For example, low frequency signals typically demonstrate improved penetration of subsurface formations, allowing them to provide better information about underlying structures and deep targets. High frequency signals, on the other hand, can provide more detail about certain fine-grained geological features. For example, high frequency signals can yield more detailed images of thin geological layers than low frequency signals. Controlled signals typically have higher frequency content, with the higher frequencies (e.g. 25 Hz or more) having higher energy than the same frequency range in uncontrolled signals. Conversely, uncontrolled signals typically have lower frequency content, with the lower frequencies (e.g. 20 Hz or less) having higher energy than the same frequency range in controlled signals. Seismic images based solely on controlled or uncontrolled signals therefore provide a suboptimal picture of subsurface structures due to the limited frequency content of the signals. For example, seismic imaging based solely on controlled signals may have suboptimal resolution and accuracy due to the limited low frequency content of controlled signals.

SUMMARY

In accordance with one or more embodiments of the present disclosure, a method for combining controlled and uncontrolled seismic data is disclosed. The method includes accessing one or more controlled signals, each controlled signal associated with a respective receiver of a plurality of receivers. The method also includes accessing one or more uncontrolled signals, each uncontrolled signal associated with a respective receiver of the plurality of receivers. The method also includes generating one or more reconstructed signals based on the one or more uncontrolled signals. The method also includes generating a composite image based at least on the one or more controlled signals and the one or more reconstructed signals.

In accordance with another embodiment of the present disclosure, a system for combining controlled and uncontrolled seismic data is disclosed. The system includes a plurality of controlled sources, a plurality of receivers, and a computer system. The computer system is configured to access one or more controlled signals, each controlled signal recorded by a respective receiver of the plurality of receivers and associated with a controlled seismic wave generated by one or more of the controlled sources. The computer system is further configured to access one or more uncontrolled signals, each uncontrolled signal recorded by a respective receiver of the plurality of receivers. The computer system is further configured to generate one or more reconstructed signals based on the one or more uncontrolled signals. The computer system is further configured to generate a composite image based at least on the one or more controlled signals and the one or more reconstructed signals.

In accordance with another embodiment of the present disclosure, a non-transitory, computer-readable medium containing instructions for combining controlled and uncontrolled seismic data is disclosed. The instructions are operable, when executed by a processor, to access one or more controlled signals, each controlled signal recorded by a respective receiver of a plurality of receivers. The instructions are further operable to access one or more uncontrolled signals, each uncontrolled signal recorded by a respective receiver of the plurality of receivers. The instructions are further operable to generate one or more reconstructed signals based on the one or more uncontrolled signals. The instructions are further operable to generate a composite image based at least on the one or more controlled signals and the one or more reconstructed signals.

BRIEF DESCRIPTION OF THE DRAWINGS

For a more complete understanding of the present invention and its features and advantages, reference is now made to the following description, taken in conjunction with the accompanying drawings, which may include drawings that are not to scale and wherein like reference numbers indicate like features, in which.

DETAILED DESCRIPTION

Some embodiments of the present disclosure provide improved seismic imaging by generating a composite seismic image based on both controlled and uncontrolled signals. As explained above, the controlled and uncontrolled signals have different amounts of energy in different frequency ranges. Controlled signals typically have higher energy in the higher frequency ranges, while uncontrolled signals typically have higher energy in the lower frequency ranges. Combining controlled seismic data and uncontrolled seismic data thus provides improved broadband characteristics in the resulting seismic images. The composite seismic image exhibits the advantages of low frequency imaging and high frequency imaging because it incorporates complimentary information about the subsurface from different types of signals. Furthermore, incorporating low-frequency uncontrolled signals into the seismic image provides the benefits of broadband frequency content without requiring the expense and complexity of using additional or more complex sources to generate broadband signals. Combining controlled and uncontrolled seismic data thus provides cost-effective improvements in the quality of seismic imaging such as improved resolution and accuracy.

Some embodiments combine controlled and uncontrolled seismic data by first imaging controlled and uncontrolled data separately. Controlled signals are imaged using migration techniques, and interferometry processing techniques are performed on uncontrolled signals to generate reconstructed signals, which are then processed into a separate image. These two images are then combined to generate a composite image that exhibits improved resolution, improved accuracy, and other benefits of broadband imaging. Other embodiments combine controlled and uncontrolled seismic data by merging the controlled and uncontrolled datasets and then imaging the merged data. As before, interferometry processing techniques are performed on uncontrolled signals to generate reconstructed signals. The reconstructed signals and controlled signals are then processed in a single imaging flow. Embodiments in which controlled and uncontrolled signals are imaged together provide a streamlined dataflow but may require additional computing resources due to the increased size of the migration dataset. Embodiments in which controlled and uncontrolled signals are imaged separately and then combined may require additional processing steps to combine the separate images, but computing resource requirements are reduced due to the smaller imaging datasets. In both cases, however, the composite image resulting from the combination of controlled and uncontrolled signals is improved due to the broadband frequency content. Combining controlled and uncontrolled seismic data therefore improves the resolution and accuracy of seismic images.

Figure 1:
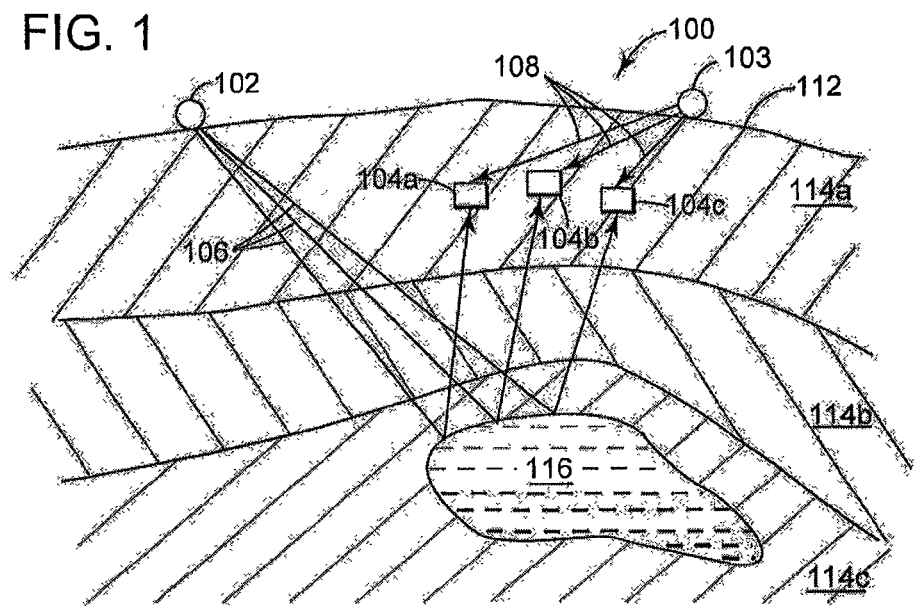
FIG. 1 illustrates a cross-sectional view of an example seismic imaging system in accordance with some embodiments of the present disclosure.

FIG. 1 illustrates a cross-sectional view of a seismic imaging system 100 that may be used to provide improved seismic images by combining controlled and uncontrolled seismic data as described above. In the illustrated embodiment, system 100 includes controlled source 102 and receivers 104. Receivers 104 may record seismic signals generated by controlled sources 102 and uncontrolled sources 103. System 100 is located in an area that includes surface 112, layers 114, and reservoir 116. Although FIG. 1 depicts a land implementation of system 100, embodiments of the present disclosure may also be used in marine environments (as shown, for example, in FIG. 2), transition zones (as shown, for example, in FIG. 3), or in any other environment where seismic imaging is performed.

System 100 analyzes controlled signals 106 and uncontrolled signals 108 to generate a composite image of the subsurface that has improved broadband frequency characteristic. System 100 may be any collection of systems, devices, or components configured to detect, record, and/or process seismic data. System 100 includes one or more controlled sources 102 and one or more receivers 104. Seismic waves (such as, for example, acoustic wave trains) propagate out from one or more controlled sources 102 and may be partially reflected, refracted, diffracted, or otherwise affected by one or more subsurface structures such as rock layers beneath the earth's surface. These waves are ultimately recorded by one or more receivers 104 and processed to generate images of the subsurface. Furthermore, surveys taken at different times can be compared to generate 4D images that show changes in subsurface formations over time. System 100 may also record and process uncontrolled signals 108, which can be combined, with controlled signals 106 at any point during the imaging process. Combining controlled and uncontrolled seismic data in this manner provides improved seismic imaging that yields a more accurate picture of subsurface formations.

Controlled source 102 may be any device that generates controlled seismic waves that are used to generate images of geological structures. Controlled source 102, which can be impulsive or vibratory, generates controlled signals 106. In particular embodiments, controlled source 102 can be a seismic vibrator, vibroseis, explosive (such as dynamite), air gun, water gun, weight drop, vibrator truck, thumper truck, piezoelectric source, or any other suitable seismic energy source. Source 102 may utilize electric motors, counter-rotating weights, hydraulics, or any other suitable structure configured to generate seismic energy. System 100 can have any suitable number, type, configuration, or arrangement of controlled sources 102. For example, system 100 can include multiple controlled sources 102 that operate in conjunction with one another. In such embodiments, controlled sources 102 can be operated by a central controller that coordinates the operation of multiple controlled sources 102. As another example, controlled sources 102 may be located on surface 112, above surface 112, or below surface 112. Furthermore, in some embodiments, a positioning system may be utilized to locate, synchronize, or time-correlate sources 102. For example, some embodiments utilize a Global Navigation Satellite System (GNSS) such as, for example, the Global Positioning System (GPS), Galileo, the BeiDou Satellite Navigation System (BDS), GLONASS, or any suitable GNSS system. Additional structures, configurations, and functionality of controlled sources 102 are described below with respect to FIG. 8.

Uncontrolled sources 103 may be any object, location, or event that emits incidental seismic waves that are not deliberately triggered or otherwise anticipated by system 100. For example, uncontrolled sources 103 can be natural phenomena such as rain, waves, earthquakes, volcanic eruptions, ice-quakes/ice-breaks in arctic environments or over frozen water bodies, or any other natural event that generates seismic waves. Uncontrolled sources 103 can also be anthropogenic objects or events such as, for example, cars, boats, drilling or pumping-related activity or machinery, or any human-related events. Uncontrolled sources 103 may be transitory or permanent and may be stationary or mobile. Uncontrolled signals 108 may be generated from any number or type of uncontrolled source 103, and uncontrolled sources 103 may have any location relative to receivers 104 that allows their emissions to be recorded. In certain situations, an uncontrolled signal can be generated by a controlled source when such sources produce signals that are not coordinated by system 100. For example, an uncontrolled signal can be generated by multiple vibratory sources that are vibrating simultaneously without synchronization.

Receivers 104 may be any devices that are operable to record seismic waves. Receivers 104 convert seismic energy into recorded signals, which may have any suitable format. For example, receivers 104 can record seismic waves as analog signals or digital signals. As a particular example, certain embodiments of receiver 104 convert seismic energy to electrical energy, allowing seismic waves to be recorded as electrical signals such as, for example, voltage signals, current signals, or any suitable type of electric signal. Other embodiments of receiver 104 record seismic energy as an optical signal or any suitable type of signal that corresponds to the received seismic energy. The resulting signals are transmitted to and recorded by recording units that may be local or remote to receivers 104. Recordings may then be communicated to a computer system for processing, as described further below with respect to FIG. 8.

System 100 may utilize any suitable number, type, arrangement, and configuration of receivers 104. For example, system 100 may include dozens, hundreds, thousands, or any suitable number of receivers 104. As another example, receivers 104 may have any suitable arrangement, such as linear, grid (as shown, for example, in FIG. 4), array, or any other suitable arrangements, and spacing between receivers 104 may be uniform or non-uniform. Furthermore, receivers 104 may be located at any suitable position. For example, receivers 104 may be located on surface 112, above surface 112, or below surface 112. Furthermore, in offshore embodiments, receivers 104 may also be located at any suitable depth within the water. Receivers 104 may also include any structure, configuration, or function described below with respect to FIGS. 2-4 and 8.

Receivers 104 may record seismic waves during periods when controlled sources 102 are generating controlled signals 106. Such periods may be referred to as periods of active acquisition. During periods of active acquisition, receivers 104 may record both controlled and uncontrolled signals. Receivers 104 may also record seismic waves when controlled sources 102 are not active. Such periods may be referred to as periods of passive acquisition. During such recording periods, receivers 104 record primarily uncontrolled signals. In some embodiments, receivers 104 may record for extended periods of time. Such recordings may span days, months, or years. Such recordings may be continuous or periodic during this span of time. In some embodiments, recordings made by the same receivers 104 at different times may be used to calculate 4D images that depict apparent changes in the survey area over time. Furthermore, seismic waves recorded by receivers 104 may be communicated to a computer system for processing, as described further below with respect to FIG. 8.

Controlled signals 106 represent portions of seismic waves generated by controlled source 102 that arrive at receivers 104. Controlled signals 106 may be surface waves, which are seismic waves that travel along or near the surface, or body waves, which are seismic waves that travel through the subsurface. Controlled signals 106 can reach receivers 104 after travelling various paths. For example, these waves can pass straight to receivers 104, or they can reflect, refract, diffract, or otherwise interact with various subsurface structures. However, for purposes of simplified illustration, only three particular paths are shown.

Uncontrolled signals 108 represent portions of seismic waves generated by uncontrolled source 103 that arrive at receivers 104. Uncontrolled signals 108 may be body waves or surface waves, and uncontrolled signals 108 can reach receivers 104 after travelling various paths. For example, these waves can pass straight to receivers 104, or they can reflect, refract, diffract, or otherwise interact with various subsurface structures. Again, however, for purposes of simplified illustration, only three particular paths are shown. After being recorded by receivers 104, uncontrolled signals 108 are combined with controlled signals 106 to generate a composite image that exhibits the benefits of broadband frequency content.

Figure 5:
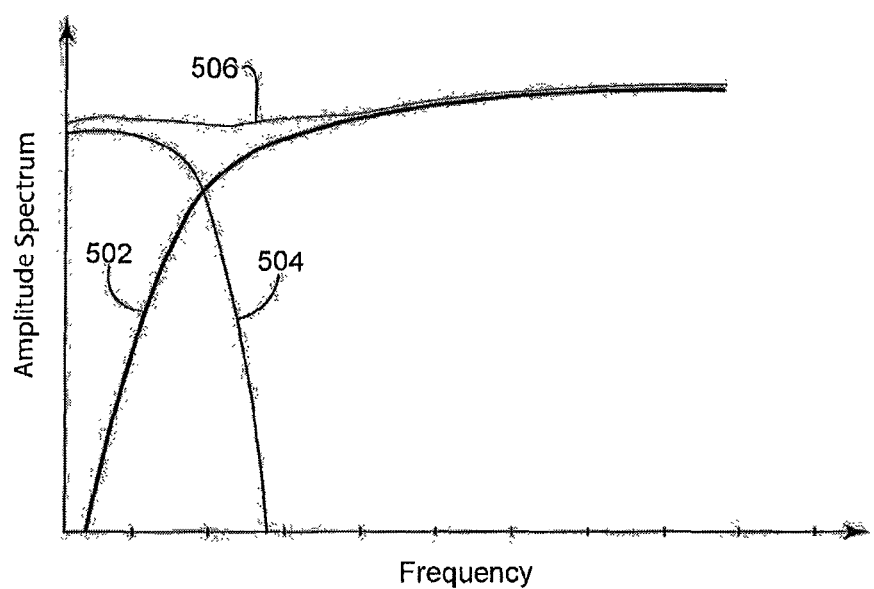
FIG. 5 illustrates in graphical form the relationship of energy to frequency of an example controlled signal, an example uncontrolled signal, and an example composite signal in accordance with some embodiments of the present disclosure.

As explained above, controlled and uncontrolled seismic data typically exhibits different frequency content. For example, controlled signals 106 may have energy more skewed toward higher frequency ranges than uncontrolled signals 108. In various embodiments, controlled and uncontrolled signals can have any suitable frequency ranges or amplitude spectra. As a particular example, in some embodiments, the average amplitude of uncontrolled signals 108 in the 0-20 Hz frequency range is greater than the average amplitude of controlled signals 106 in the 0-20 Hz frequency range, though these ranges are merely examples. Furthermore, in some embodiments the average amplitude of uncontrolled signals 108 in the 20-100 Hz frequency range is less than the average amplitude of controlled signals 106 in the 20-100 Hz frequency range, though these ranges are merely examples. Other embodiments may have any suitable frequency ranges such that the controlled and uncontrolled signals have different frequency contents and can be combined to provide complimentary seismic data. A simplified example of the amplitude spectra of controlled and uncontrolled signals is illustrated in FIG. 5.

Surveys can be conducted in any suitable area, including on-shore locations, offshore locations, transition zones, or any other suitable area. Such areas may or may not be utilized for production during the survey period. For example, the survey area may include a reservoir 116 that is being actively developed, and surveys may be conducted continuously or periodically during the period of production. Combining controlled and uncontrolled seismic data in such embodiments provides more accurate information about relevant changes in and around reservoir 116. Such information may improve production efficiency, reduce costs, and provide other benefits related to reservoir production.

Surface 112 represents the surface of area 110. Surface 112 may be an air-earth boundary or a water-earth boundary depending on the location of area 110. Surface 112 may reflect seismic waves generated by sources 102, which may cause receivers 104 to record waves that have reflected multiple times. Signals from waves that have reflected multiple times may be referred to as "multiples."

Layers 114 represent geological layers of area 110. Area 110 may have any number, composition, and/or arrangement of layers 114. Body waves may be refracted, reflected, or otherwise affected when traveling through layers 114, particularly at the interfaces between different layers 114. Surface waves may also be attenuated, dispersed, or otherwise affected by geological structures during propagation. Layers 114 may have various densities, thicknesses, or other characteristics that may affect seismic wave propagation. Various characteristics of layers 114 may affect the ability of certain frequencies to provide accurate seismic imaging. For example, thin layers or certain fine-grained subsurface features may be more effectively imaged by higher frequency signals, such as controlled signals 106. Furthermore, low frequency signals such as uncontrolled signals 108 may be more effective at penetrating certain layers or other subsurface structures. Thus, signals with higher energy in the lower frequency ranges can provide better information about the underlying structures. Combining controlled and uncontrolled seismic data therefore improves the quality of seismic images by combining the imaging benefits of different frequency ranges.

Reservoir 116 may be any geological formation targeted for production. For example, reservoir 116 may contain oil, gas, or any other targeted material. In embodiments involving actively producing reservoirs 116, reservoir production may cause changes to reservoir 116 (such as, for example, fluid displacement) or the surrounding layers 114 that may affect the optimal exploration or production strategy. Accurate, high-resolution images of reservoir 116 are important to developing effective reservoir extraction plans. Some embodiments therefore provide improved reservoir extraction by combining controlled and uncontrolled seismic data to yield broadband frequency content, which provides higher quality images as explained above.

Figure 2:
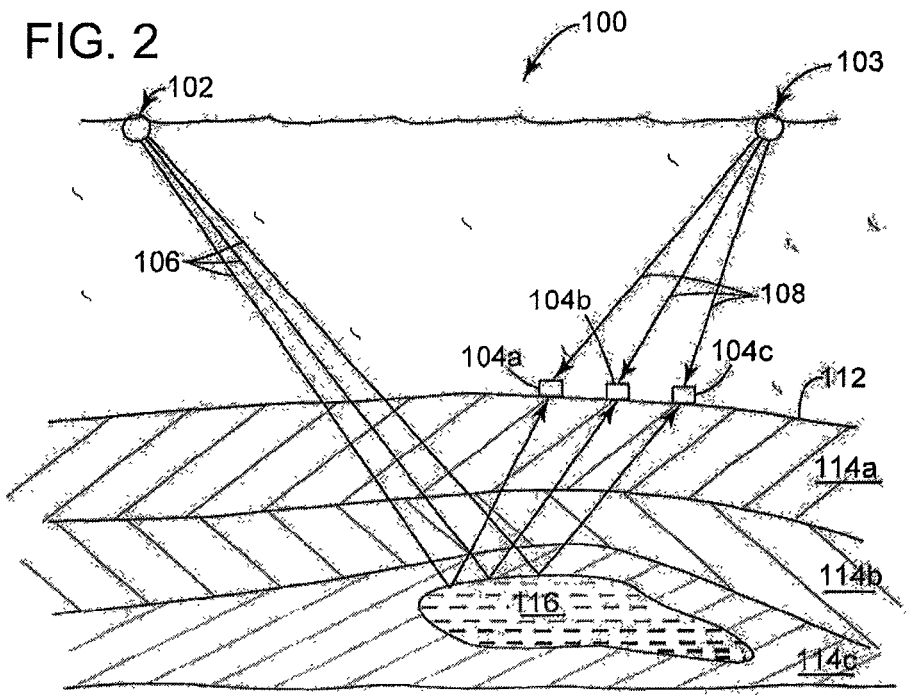
FIG. 2 illustrates a cross-sectional view of an example seismic imaging system in an off-shore environment in accordance with some embodiments of the present disclosure.
Figure 3:
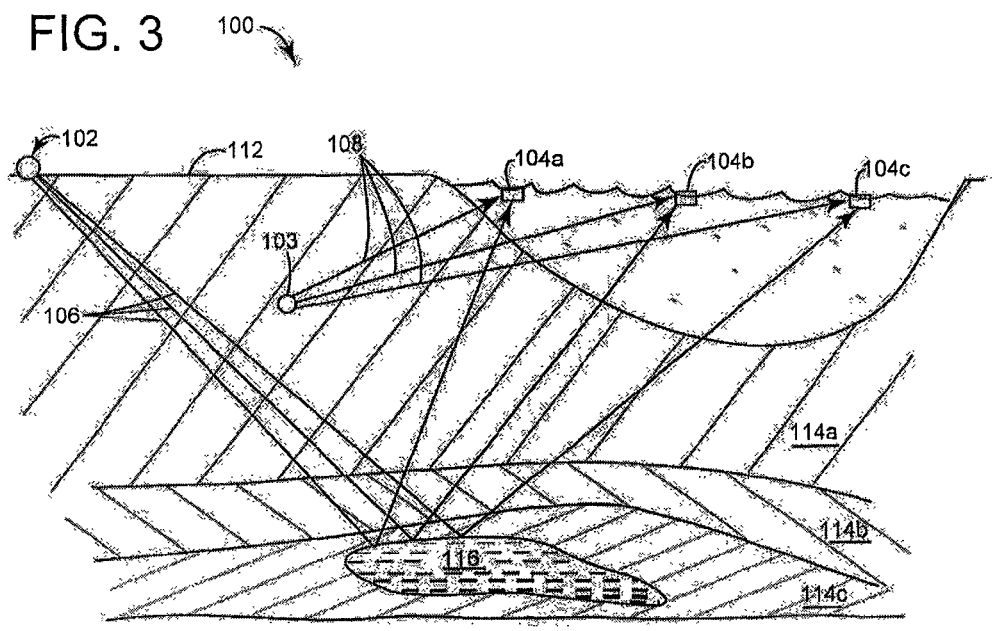
FIG. 3 illustrates a cross-sectional view of an example seismic imaging system in a transition zone in accordance with some embodiments of the present disclosure.

FIGS. 2 and 3 illustrate cross-sectional views of example seismic imaging systems in other types of survey environments. As explained above, the combination of controlled and uncontrolled signals can be applied in any type of seismic survey environment. For example, FIG. 2 illustrates an example seismic imaging system in an offshore environment, and FIG. 3 illustrates an example seismic imaging system in a transition zone. While different survey environments may utilize different types of sources 102 or receivers 104, receive different types of controlled signals 106 or uncontrolled signals 108, the imaging techniques described herein can be applied regardless of the particular features of the survey environment.

Figure 4:
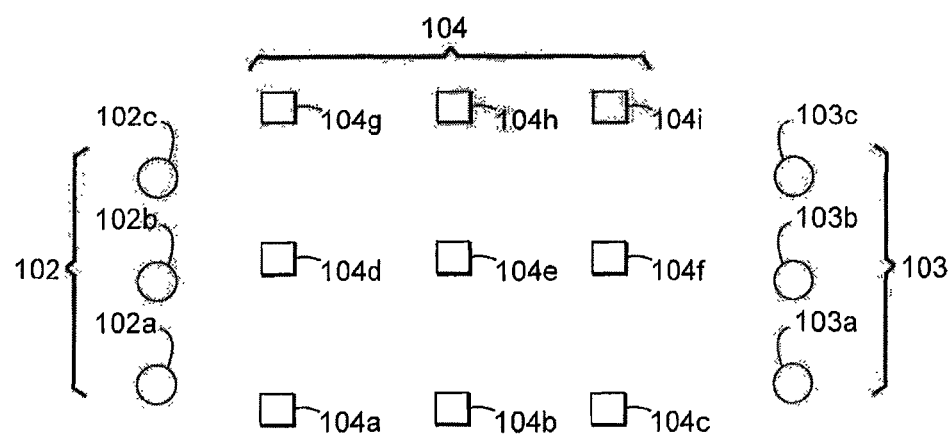
FIG. 4 illustrates a plan view of an example seismic imaging system in accordance with some embodiments of the present disclosure.

FIG. 4 illustrates a plan view of an example configuration of system 100. As shown in FIG. 4, receivers 104 may be arranged in a grid at different distances and at different lateral offsets from controlled sources 102. Some embodiments may also utilize receivers 104 at different depths, providing a three-dimensional array of receivers 104. Controlled sources 102 may be located along an axis of receivers 104 or off such axes. Various embodiments may use any suitable number, type, configuration, and/or arrangement of controlled sources 102 and receivers 104. For example, controlled sources 102 and receivers 104 may have organized or random positions.

FIG. 5 illustrates in graphical form the relationship of energy to frequency of an example controlled signal, an example uncontrolled signal, and an example composite signal. FIG. 5 depicts simplified amplitude spectra of these signals to demonstrate the broadband frequency characteristics of an example composite signal. For purposes of simplified illustration, these amplitude spectra are shown as smooth curves, though in practice they may exhibit greater variation. The illustrated amplitude spectra includes controlled signal 502, uncontrolled signal 504, and composite signal 506.

As explained above, controlled signals typically have higher energy in the higher frequency ranges, while uncontrolled signals typically have higher energy in the lower frequency ranges. For example, in some embodiments, controlled signal 502 has greater amplitudes than uncontrolled signal 504 at frequencies above approximately 20 Hz, and uncontrolled signal 504 has greater amplitudes than uncontrolled signal 502 at frequencies below approximately 20 Hz. However, these amplitude spectra are provide merely as examples, and other embodiments may use controlled and uncontrolled signals with any suitable amplitude spectra. Because the frequency contents of the controlled and uncontrolled signals are different, each provides certain distinct imaging benefits due to their different frequency characteristics, as explained above. Composite signal 506, which is based at least on controlled signal 502 and uncontrolled signal 504, exhibits the higher energy characteristics throughout the illustrated frequency range. Due to the physical properties of seismic waves of different frequencies, the broadband frequency characteristics of composite signal 506 provide improved resolution and accuracy when performing seismic imaging of subsurface formations. While particular amplitude spectra are shown to illustrate the frequency characteristics of different types of signals in certain embodiments, other embodiments may use controlled and uncontrolled signals having different amplitude spectra from those shown in FIG. 5. Furthermore, while illustrated as an explicit signal, certain embodiments do not explicitly calculate combined signals prior to generating the composite image, as explained below with respect to FIGS. 6 and 7. Composite signal 506 is shown to illustrate the frequency characteristics of composite images generated based on both controlled and uncontrolled seismic data.

Figure 6:
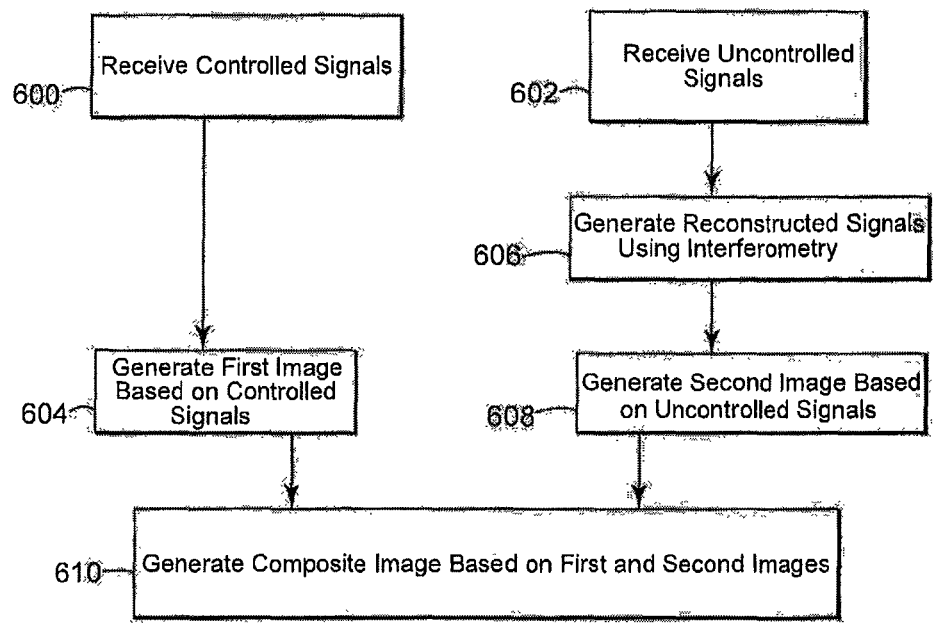
FIG. 6 illustrates a flow chart of an example method for combining controlled and uncontrolled seismic data in accordance with some embodiments of the present disclosure

FIG. 6 illustrates a flow chart of an example method for combining controlled and uncontrolled seismic data in accordance with some embodiments of the present disclosure. This sequence is provided as an example, and various embodiments may perform all, some, or none of these steps. Furthermore, certain embodiments may perform different steps in addition to or in place of the illustrated steps discussed below. This sequence can also be repeated any suitable number of times to provide multiple composite images over a period of time such as, for example, in embodiments using PRM. Furthermore, any suitable processing steps discussed below may be performed in the time domain or frequency domain. For example, seismic data can be transformed between the time and frequency domains using Fourier Transforms and Inverse Fourier Transforms or using any suitable technique.

At step 600, system 100 receives controlled seismic data. In some embodiments, controlled sources 102 generate controlled signals 106, which are then recorded by receivers 104, as described above. At step 602, system 100 receives uncontrolled seismic data. In some embodiments, uncontrolled sources 103 generate uncontrolled signals 108, which are then recorded by receivers 104, as described above. The controlled and uncontrolled signals may be recorded simultaneously or at different times. Controlled signals 106 may exhibit higher energy content at higher frequencies and lower frequency content at lower frequencies, as compared to uncontrolled signals 108. For example, in some embodiments, controlled signals 106 may have lower amplitudes than uncontrolled signals 108 below a threshold frequency.

At step 604, system 100 generates a first image based on the controlled seismic data. Various embodiments may use any suitable techniques for processing seismic data. For example, in some embodiments, after controlled signals 106 are recorded by receivers 104, the data is collected and organized based on offset distances, such as the distance between a particular controlled source 102 and a particular receiver 104 or the amount of time it takes for signals 106 to reach receivers 104. The amount of time a signal takes to reach a receiver 104 may be referred to as the "travel time." Data collected during a survey by a particular receiver 104 may be referred to as a "trace," and multiple traces may be gathered, processed, and utilized to generate a model of the subsurface structure. A "gather" refers to any set of seismic data grouped according to a common feature. For example, a series of traces reflected from the same common subsurface point may be referred to as a common midpoint gather (CMP). Other examples of gathers include common conversion point (CCP) gather, a common shot gather (one source 102 or shot received by multiple receivers 104), common receiver gather (multiple sources 102 received by one receiver 104) (CRG), or any other suitable type of gather based on the implementation or goals of the processing. The traces from a gather may be summed (or "stacked"), which may improve the signal-to-noise ratio (SNR) over a "single-fold" stack because summing tends to cancel out incoherent noise. A "fold" indicates the number of traces in a gather.

Additional processing techniques may also be applied to the controlled signals to improve the resulting images further. For example, some embodiments reconstruct wave propagation of controlled signals 106 using frequency-picking techniques, correlation, or other suitable methods. As another example, certain embodiments using impulsive sources (such as, for example, a weight drop, air gun, or explosives) apply windowing techniques to reconstruct wave propagation. In some embodiments, in addition to or in place of the above processing methods, the first image is generated using one of several different migration techniques. For example, the first image can be generated using Kirchhoff migration, F-K migration, F-X migration, controlled beam migration, reverse time migration, or any suitable migration technique. Furthermore, system 100 may generate any suitable number of first images. For examples, multiple first images may be generated based on the controlled signals by using different gathers, different processing methods, or other techniques.

At step 606, system 100 calculates reconstructed signals based on the uncontrolled signals. As used herein, a reconstructed signal refers to any modified signal that is generated by processing one or more signals recorded by receivers 104. In some embodiments, reconstructed signals are generated by performing interferometry processing techniques on the uncontrolled signals. Interferometry may refer to coda interferometry, which may also be referred to as "C3." Interferometry processing techniques can include correlation, convolution, deconvolution, or other suitable processing of a single trace (e.g. auto-correlation) or different traces (e.g., cross-correlation). Interferometry processing techniques can be used to reconstruct surface waves, body waves, or any suitable wavefield. For example, in some embodiments, each reconstructed signal is generated based on an analysis of the uncontrolled signals recorded by a pair of receivers 104. As a specific example, some embodiments calculate reconstructed signals by cross-correlating the uncontrolled signals. This process isolates coherent signal and results in a reconstructed signal that mimics a signal having a receiver as the source. Reconstructed signals can therefore accommodate the unknown point of origin of an uncontrolled signal. Reconstruction operations can be performed for any pair of receivers 104. Reconstructed signals can be calculated for every possible receiver pair, or they can be calculated for any suitable subset of the possible receiver pairs.

In some embodiments, calculating the reconstructed signal also involves performing one or more preprocessing steps. In such embodiments, the reconstructed seismic signals are calculated based on the output of the preprocessing steps. For example, certain embodiments may use frequency-domain normalization, time-domain normalization, frequency filtering, or other processing techniques that operate to separate controlled and uncontrolled signals. As another example, certain embodiments may perform data beamforming, velocity filtering, or any suitable method of preprocessing seismic signals prior to calculating reconstructed signals. Data beamforming operates to orient receivers 104 toward a preferred wave origin. Velocity filtering removes certain unwanted waves or portions of waves (such as, for example, slower waves) from the analysis, or it may select and keep certain waves of interest. Velocity filtering includes F-K filtering, radon filtering, or any suitable velocity filtering method. Furthermore, in some embodiments, reconstructed signals may be modified prior to migration to adjust phase, amplitude, or any suitable aspect of the signals.

At step 608, system 100 generates a second image based on the uncontrolled signals. As used herein, generating an image based on the uncontrolled signals may refer to generating an image based directly on the uncontrolled signal or based on the output of processing steps that use the uncontrolled signals. For example, this step may involve generating the second image based on the reconstructed signals or on otherwise processed or modified versions of these signals. The generation of the second image may utilize any suitable image processing technique described above with respect to step 604. Furthermore, system 100 may generate any suitable number of second images. For examples, multiple second images may be generated based on the uncontrolled signals by using different gathers, different processing methods, or other techniques.

At step 610, system 100 generates a composite image based on the first and second images. The first and second images can be combined using any suitable technique. For example, some embodiments generate the composite image by averaging the first and second images, which can involve any suitable averaging method such as, for example, weighted averaging. Other embodiments calculate a median, and still other embodiments calculate a summation. Summation techniques include weighted summation, diversity stacking, or any suitable additive process. Furthermore, while described as a combination of the first and second images, the composite image may incorporate any suitable number of first images and any suitable number of second images. Combining the first and second images results in a composite image that exhibits beneficial frequency characteristics of both upstream seismic datasets. The composite image therefore provides improved resolution and accuracy due to the broadband frequency content. Furthermore, because the images are computed on individual datasets (rather than a merged dataset as shown in FIG. 7), the need for additional computing resources can be mitigated, which may provide improved cost-effectiveness and response times.

Figure 7:
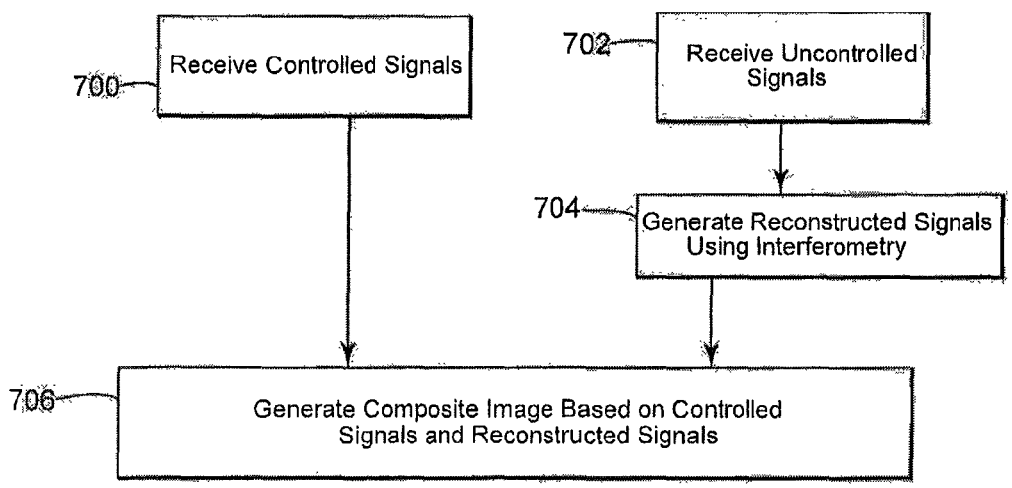
FIG. 7 illustrates a flow chart of an example method for combining controlled and uncontrolled seismic data in accordance with some embodiments of the present disclosure.

FIG. 7 illustrates a flow chart of an alternative method for combining controlled and uncontrolled seismic data in which the results of the interferometry processing methods are merged with the controlled signals prior to imaging. This sequence is provided as an example, and various embodiments may perform all, some, or none of these steps. Furthermore, certain embodiments may perform different steps in addition to or in place of the illustrated steps discussed below. This sequence can also be repeated any suitable number of times to provide multiple composite images over a period of time such as, for example, in embodiments using PRM. Furthermore, any suitable processing steps discussed below may be performed in the time domain or frequency domain.

At step 700, system 100 receives controlled signals 106. Controlled signals are received as described above with respect to step 600. At step 702, uncontrolled signals 108 are received, and at step 704, reconstructed signals are generated by performing interferometry processing techniques on the uncontrolled signals. Again, steps 702 and 704 are performed analogously to steps 602 and 604, respectively.

At step 706, system 100 generates a composite image based on the controlled and uncontrolled signals. In some embodiments, the controlled seismic signals and the reconstructed signals are merged before performing the image processing. Because the merged dataset is larger than the component datasets, the imaging calculations are more complex and may require additional processing resources or time. As before, the composite image incorporates complimentary information about the subsurface and therefore provides a more accurate picture of the surveyed area.

Various embodiments may perform some, all, or none of the steps described above with respect to FIGS. 6 and 7. For example, rather than generating and combining multiple images or migrating multiple datasets to generate a single image, certain embodiments analyze uncontrolled signals 108 to deduce information from this data that is then applied to a final image. As a specific example, velocity models or other models can be generated from an analysis of the uncontrolled seismic data and then applied to the controlled seismic data to generate an improved image. Furthermore, certain embodiments may perform certain steps in different orders or in parallel, and certain embodiments may modify one or more steps. For example, multiple sets of controlled or uncontrolled signals may be recorded or processed in parallel. Moreover, one or more steps may be repeated. For example, the steps shown in FIGS. 6 and 7 can be performed repeatedly in a PRM environment to provide improved 4D images. Additionally, while system 100 has been described as performing these steps, any suitable component of system 100 may perform one or more steps. For example, computer system 800 (shown in FIG. 8) may perform all or some of the steps described above.

Figure 8:
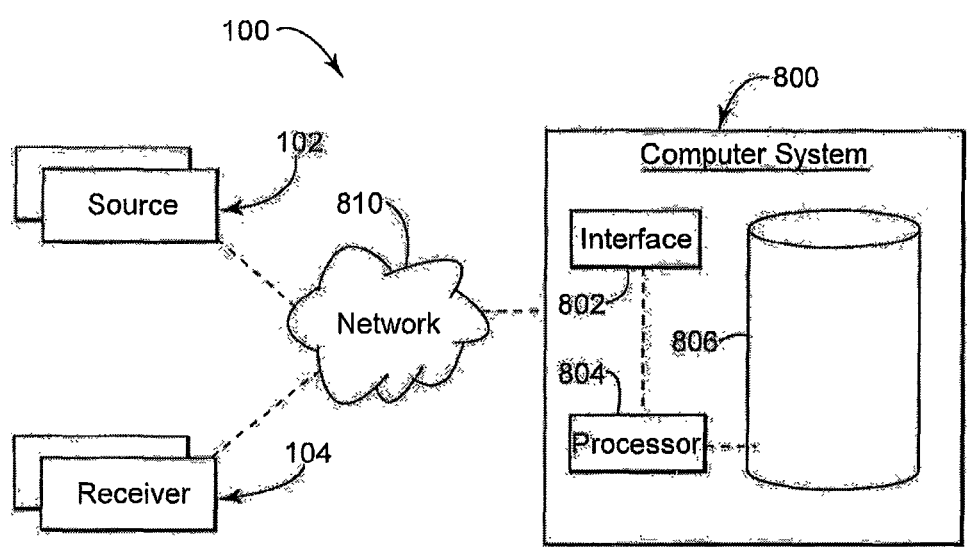
FIG. 8 illustrates a schematic view of an example seismic imaging system in accordance with some embodiments of the present disclosure.

FIG. 8 illustrates a schematic of an example system 100 that can be used to combine controlled and uncontrolled seismic data. System 100 includes sources 102, receivers 104, and computer system 800, which are communicatively coupled via network 810.

Computer system 800 can generate composite seismic images based on signals generated by a wide variety of controlled sources 102. For example, computer system 800 can operate in conjunction with controlled sources 102 having any structure, configuration, or function described above with respect to FIGS. 1-4, 6, and 7. In particular embodiments, sources 102 may be impulsive (such as, for example, explosives or air guns) or vibratory. Impulsive sources may generate a short, high-amplitude seismic signal while vibratory sources may generate lower-amplitude signals over a longer period of time. Vibratory sources may be instructed, by means of a pilot signal, to generate a target seismic signal with energy at one or more desired frequencies, and these frequencies may vary over time. However, the seismic wave actually generated by vibratory source may differ from the target seismic signal.

Controlled and uncontrolled seismic data can also be combined in embodiments using controlled sources 102 that radiate one or more frequencies of seismic energy during predetermined time intervals. For example, some embodiments may use controlled sources 102 that generate monofrequency emissions such as, for example, certain SEISMOVIE sources or other types of monofrequency-emitting sources. As another example, some embodiments may use controlled sources 102 that radiate varying frequencies. In such embodiments, controlled source 102 may impart energy at a starting frequency and the frequency may change over a defined interval of time at a particular rate until a stopping frequency is reached. The impartation of a range of frequencies may be referred to as a sweep, frequency sweep, or seismic sweep. The difference between the starting and stopping frequencies of the sweep may be referred to as the range of the sweep and the interval of time to sweep through the frequencies may be referred to as the sweep time. A sweep may be a downsweep, in which the stopping frequency is lower than the starting frequency. By contrast, in an upsweep the stopping frequency is higher than the starting frequency. Furthermore, a sweep may be linear such that the frequency changes linearly over the sweep time at a rate dictated by the starting and stopping frequencies and the sweep time. By contrast, in a nonlinear sweep, the frequency may vary nonlinearly between the starting and stopping frequencies over the sweep time. For example, a nonlinear sweep may include a quadratic sweep, a logarithmic sweep, or any other suitable sweep configuration. In some embodiments, a sweep may be continuous such that controlled source 102 generates substantially all the frequencies between the starting and stopping frequency. In other embodiments, the frequency is gradually increased during the sweep. The gradual increase may be substantially continuous or may use various sized steps to sweep from the starting frequency to the stopping frequency. In some embodiments, a sweep may be discontinuous so that controlled source 102 does not generate particular frequencies between the starting and stopping frequency and receivers 104 do not receive or report data at those particular frequencies. The frequency characteristics of the controlled source 102 affect the amplitude spectra of the resulting signals and therefore the resulting seismic image.

As explained above, the combination of controlled and uncontrolled seismic data is not limited to particular types of receivers 104. For example, in some embodiments, receivers 104 include geophones, hydrophones, accelerometers, fiber optic sensors (such as, for example, a distributed acoustic sensor (DAS)), streamers, or any suitable device. Such devices may be configured to detect and record energy waves propagating through the subsurface geology with any suitable, direction, frequency, phase, or amplitude. For example, in some embodiments, receivers 104 are vertical, horizontal, or multicomponent sensors. As particular examples, receivers 104 may comprise three component (3C) geophones, 3C accelerometers, or 3C Digital Sensor Units (DSUs). In certain marine embodiments, receivers 104 are hydrophones contained inside buoyant streamers, which may be towed behind a vessel. In such embodiments, controlled sources 102 and receivers 104 may be towed behind the same or a different vessel. Streamers may also be used in on-shore survey environments. In other offshore embodiments, receivers 104 are situated on or below the ocean floor or other underwater surface. Furthermore, in some embodiments, controlled signals and uncontrolled signals can be recorded with different sets of receivers 104. For example, some embodiments may use dedicated receiver spreads for each type of signal, though these receiver spreads may cover the same area, and each receiver spread can be composed of different types of receivers 14.

Computer system 800 may include any suitable devices operable to process seismic data recorded by receivers 104. Computer system 800 may be a single device or multiple devices. For example, computer system 800 may be one or more mainframe servers, desktop computers, laptops, cloud computing systems, or any suitable devices. Computer system 800 receives data recorded by receivers 104 and processes the controlled and uncontrolled seismic data to generate a composite image with broadband frequency characteristics. Computer system 800 may be operable to perform the composite imaging techniques described above with respect to FIGS. 6 and 7. Computer system 800 may also be operable to coordinate or otherwise control or manage controlled sources 102. Computer system 800 may be communicatively coupled to receivers 104 via network 810 during the recording process, or it may receive the recorded data after the collection is complete. In the illustrated embodiment, computer system 800 includes network interface 802, processor 804, and memory 806.

Network interface 802 represents any suitable device operable to receive information from network 810, transmit information through network 810, perform suitable processing of information, communicate with other devices, or any combination thereof. Network interface 802 may be any port or connection, real or virtual, including any suitable hardware and/or software (including protocol conversion and data processing capabilities) that communicates through a LAN, WAN, or other communication system. This communication allows computer system 800 to exchange information with network 810, other software computer systems 800, controlled sources 102, receivers 104, or other components of system 100. Computer system 800 may have any suitable number, type, and/or configuration of network interface 802.

Processor 804 communicatively couples to network interface 802 and memory 806 and controls the operation and administration of computer system 800 by processing information received from network interface 802 and memory 806. Processor 804 includes any hardware and/or software that operates to control and process information. In some embodiments, processor 804 may be a programmable logic device, a microcontroller, a microprocessor, any suitable processing device, or any suitable combination of the preceding. Computer system 800 may have any suitable number, type, and/or configuration of processor 804. Processor 804 may execute one or more sets of instructions to implement the generation of a composite image based on controlled and uncontrolled seismic data, including the steps described above with respect to FIGS. 6 and 7. Processor 804 may also execute any other suitable programs to facilitate the generation of broadband composite images such as, for example, user interface software to present one or more GUIs to a user.

Memory 806 stores, either permanently or temporarily, data, operational software, or other information for processor 804, other components of computer system 800, or other components of system 100. Memory 806 includes any one or a combination of volatile or nonvolatile local or remote devices suitable for storing information. For example, memory 806 may include random access memory (RAM), read only memory (ROM), flash memory, magnetic storage devices, optical storage devices, network storage devices, cloud storage devices, solid-state devices, external storage devices, any other suitable information storage device, or a combination of these devices. Memory 806 may store information in one or more databases, file systems, tree structures, any other suitable storage system, or any combination thereof. Furthermore, different types of information stored in memory 806 may use any of these storage systems. Moreover, any information stored in memory may be encrypted or unencrypted, compressed or uncompressed, and static or editable. Computer system 800 may have any suitable number, type, and/or configuration of memory 806. Memory 806 may include any suitable information for use in the operation of computer system 800. For example, memory 806 may store computer-executable instructions operable to perform the steps discussed above with respect to FIGS. 6 and 7 when executed by processor 804. Memory 806 may also store any seismic data or related data such as, for example, raw seismic data, reconstructed signals, velocity models, seismic images, or any other suitable information.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interface 802, one or more portions of processor 804, one or more portions of memory 806, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. For example, while the embodiments of FIGS. 1-4 and 8 illustrate particular configurations of controlled sources 102 and receivers 104, any suitable number, type, and configuration may be used. As another example, any suitable method of calculating reconstructed signals may be used in certain embodiments. As another example, while this disclosure describes certain data processing operations that may be performed using the components of system 100, any suitable data processing operations may be performed where appropriate. Furthermore, certain embodiments may alternate between or combine one or more data processing operations described herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of seismic exploration of a subsurface formation, the method comprising:
    accessing one or more controlled signals, each controlled signal being detected by receivers disposed and configured to detect seismic signals emerging from the subsurface formation;
    accessing one or more uncontrolled signals detected by the receivers, the uncontrolled signals having a different frequency content than the controlled signals;
    generating one or more reconstructed signals based on the one or more uncontrolled signals; and
    generating a composite image of the subsurface formation based at least on the one or more controlled signals and the one or more reconstructed signals by
        generating a first seismic image based at least on the one or more controlled signals;
        generating a second seismic image based at least on the one or more reconstructed signals; and
        generating the composite image based at least on the first and second seismic images.

2. The method of claim 1, wherein generating the composite image comprises performing one of the following operations on the first and second seismic images:
    an averaging operation;
    a median operation; and
    a summation operation.

3. The method of claim 1, wherein generating the composite image comprises performing a migration of the one or more controlled signals and the one or more reconstructed signals.

4. The method of claim 3, wherein the migration uses one of the following migration processes:
    Kirchhoff migration;
    F-K migration;
    F-X migration;
    controlled beam migration; or
    reverse time migration.

5. The method of claim 1, wherein generating the one or more reconstructed signals comprises performing interferometry processing techniques on the one or more uncontrolled signals.

6. The method of claim 1, wherein the average amplitude of the one or more uncontrolled signals below a threshold frequency is greater than the average amplitude of the one or more controlled signals below the threshold frequency.

7. The method of claim 1, wherein amplitudes of the uncontrolled signals at frequencies less than 20 Hz are larger than amplitudes of the controlled signals the frequencies less than 20 Hz.

8. A system for seismic exploration of a subsurface formation, the system comprising:
    a plurality of controlled sources;

a plurality of receivers disposed and configured to detect seismic signals emerging from the subsurface formation; and a computer system configured to:

access one or more controlled signals detected by the receivers and associated with a controlled seismic wave generated by one or more of the controlled sources;

access one or more uncontrolled signals detected by the receivers, the uncontrolled signals having a different frequency content than the controlled signals;

generate one or more reconstructed signals based on the one or more uncontrolled signals; and generate a composite image of the subsurface formation based at least on the one or more controlled signals and the one or more reconstructed signals by generating a first seismic image based at least on the one or more controlled signals;

generating a second seismic image based at least on the one or more reconstructed signals; and generating the composite image based at least on the first and second seismic images.

9. The system of claim 8, wherein the computer system is configured to generate the composite image by performing one of the following operations on the first and second seismic images:

an averaging operation;
a median operation; or
a summation operation.

10. The system of claim 8, wherein the computer system is configured to generate the composite image by performing a migration of the one or more controlled signals and the one or more reconstructed signals.

11. The system of claim 10, wherein the migration uses one of the following migration processes:

Kirchhoff migration;
F-K migration;
F-X migration;
controlled beam migration; or
reverse time migration.

12. The system of claim 8, wherein the computer system is configured to generate the one or more reconstructed signals by performing interferometry processing techniques on the one or more uncontrolled signals.

13. The system of claim 8, wherein the average amplitude of the one or more uncontrolled signals below a threshold frequency is greater than the average amplitude of the one or more controlled signals below the threshold frequency.

14. The system of claim 8, wherein amplitudes of the uncontrolled signals at frequencies less than 20 Hz are larger than amplitudes of the controlled signals the frequencies less than 20 Hz.

15. A non-transitory computer-readable medium containing instructions for performing a method of seismic exploration of a subsurface formation, the instructions being operable, when executed by a processor, to:

access one or more controlled signals detected by receivers disposed and configured to detect seismic signals emerging from the subsurface formation;

access one or more uncontrolled signals detected by the receivers, the uncontrolled signals having a different frequency content than the controlled signals;

generate one or more reconstructed signals based on the one or more uncontrolled signals; and generate a composite image of the subsurface formation based at least on the one or more controlled signals and the one or more reconstructed signals by generating a first seismic image based at least on the one or more controlled signals;

generating a second seismic image based at least on the one or more reconstructed signals; and generating the composite image based at least on the first and second seismic images.

16. The medium of claim 15, wherein the instructions are operable to generate the composite image by performing one of the following operations on the first and second seismic images:

an averaging operation;
a median operation; or
a summation operation.

17. The medium of claim 15, wherein the instructions are operable to generate the composite image by performing a migration of the one or more controlled signals and the one or more reconstructed signals.

18. The medium of claim 17, wherein the migration uses one of the following migration processes:

Kirchhoff migration;
F-K migration;
F-X migration;
controlled beam migration; or
reverse time migration.

19. The medium of claim 15, wherein the instructions are operable to generate the one or more reconstructed signals by performing interferometry processing techniques on the one or more uncontrolled signals.

20. The medium of claim 15, wherein amplitudes of the uncontrolled signals at frequencies less than 20 Hz are larger than amplitudes of the controlled signals the frequencies less than 20 Hz.

* * * * *